United States Patent [19]

Jordan

[11] Patent Number: 5,280,570
[45] Date of Patent: Jan. 18, 1994

[54] SPECTACLE IMAGING AND LENS SIMULATING SYSTEM AND METHOD

[76] Inventor: Arthur J. Jordan, 200 Mifflin Ave., Scranton, Pa. 18503-1907

[21] Appl. No.: 943,924

[22] Filed: Sep. 11, 1992

[51] Int. Cl.$^5$ ............................................. G06F 15/62
[52] U.S. Cl. ..................................... 395/135; 395/139; 364/400; 364/413.01
[58] Field of Search .................. 358/93; 364/401, 403, 364/400, 413.01; 382/47; 395/135, 139; 434/99; H04N 9/74

[56] References Cited

U.S. PATENT DOCUMENTS

| | | | |
|---|---|---|---|
| 4,261,012 | 4/1981 | Maloomian | 358/93 |
| 4,517,654 | 5/1985 | Carmean | 395/135 |
| 4,730,260 | 3/1988 | Mori et al. | 395/135 |
| 4,731,743 | 3/1988 | Blancato | 395/135 |
| 4,845,641 | 7/1989 | Ninomiya et al. | 395/135 |
| 5,060,171 | 10/1991 | Steir et al. | 395/135 |
| 5,195,030 | 3/1993 | White | 364/401 |

OTHER PUBLICATIONS

Mori et al.; "Patent Abstracts of Japan"; 61-80222; Aug. 1986. *Method and Apparatus for adjusting Spectacles.*

*Primary Examiner*—Roy N. Envall, Jr.
*Assistant Examiner*—Stephen R. Tkacs
*Attorney, Agent, or Firm*—Oppedahl & Larson

[57] ABSTRACT

A system is provided permitting a patient to visualize how he or she would look given a particular choice of spectacle frames. The system takes into account the prescription information (spherical, and for astigmatic correction the cylinder and axis) and provides for the patient an image showing substantially faithfully how the patient would look if wearing the spectacle frames with lenses according to the prescription.

15 Claims, 3 Drawing Sheets

SPECTACLE IMAGING AND LENS SIMULATING SYSTEM AND METHOD

This invention relates to systems for permitting ophthalmological patients of opticians and optometric patients to visualize and select spectacles, and relates more particularly to systems permitting such visualizations with attention to details peculiar to spectacles due to the optical effects of lenses.

BACKGROUND OF THE INVENTION

Among the many activities undertaken when a patient visits an ophthalmologist, optometrist, or optician for spectacles is the selection of frames and lens styles. Most patients appreciate the importance of considering the aesthetic appearance of the proposed frames in connection with the patient's face, but few patients appreciate that the overall aesthetic presentation involves not only the frames themselves but also the manner in which the proposed lenses will affect the part of the body seen through the lens by others. The time-honored process by which a patient selects a frame is to try on dozens or hundreds of frames by physical placement of the frames on the face. This is time-consuming, of course, and requires that the frames be physically present and available. It generally takes place in front of a conventional flat mirror, a consequence of which is that the patient sees an image that is the left-to-right reverse of what everyone else sees.

It is thus desired to have a computer system that would permit trying on of frames without the requirement of physical presence of the frames and that would streamline the trying-on of many proposed frames, and which permits the patient to see an image that is not reversed as a mirror image would be.

The selection of frames and lenses is also driven by lifestyle issues, such as the hobbies and activities enjoyed by the patient, whether there will be a considerable amount of night driving, the shape of the patient's face, and hairstyles worn by the patient. It is thus desired to have a computer system that would receive such information from the patient; the system would desirably take the information into account when preparing a list or queue of candidate frame and lens styles to be shown to the patient.

Those familiar with computer systems will appreciate that many systems have been proposed to assist customers in viewing or "trying on" consumer goods and the like, having in common with the present system the use of a camera to capture an image of the customer and the user of a display for the customer. Proposed systems have been directed to customers trying on clothing, trying out hairstyles, and simulating the effects of cosmetic surgery. For a variety of reasons only some of which are technical in nature, most such systems have not been commercially successful. In any event, no such systems known to applicant have addressed the many problems that are peculiar to the fitting of spectacles.

A most striking difficulty with trying on spectacles (as distinguished, for example, from trying on clothing or a hair style) is that by definition when the proposed new frame is on the patient's face, the patient's old spectacles are not. The patient cannot see clearly because no corrective lenses are in the optical path when viewing oneself in a mirror.

Other difficulties also present themselves when one is trying on spectacles. The mere placement of empty frames (frames lacking lenses) on the face gives little or no clue to the patient as to how the proposed prescription lenses will change how the patient appears to others. Depending on the prescription, and as will be described further below, the lenses may magnify the eyes or make them appear smaller; the line of the face visible through the lenses is also affected. Yet another consequence of the choice of a particular frame is that it may have a lens area larger or smaller than that of another frame. For those with very strong prescriptions it is sometimes noted after the prescription has been filled that if a frame with large lenses was selected, the distortions from the strong lenses are prominent. Trying on empty frames does not readily permit the patient to assess this consequence. But nothing in prior art systems known to applicant addresses, let alone solves, these difficulties.

It is thus desirable to provide a system for trying on spectacles that provides an image for the patient that portrays with some fidelity the appearance that will be presented if the proposed frames and proposed lenses were to be manufactured and placed on the face, it is desirable that the portrayal take into account the lens area, the spherical correction of the lenses, and, where astigmatic correction will be provided, the effects of that correction.

For most opticians the ordering, stocking, and reordering of lenses and frames is a purely manual, and thus profoundly inefficient, process. It is thus desired to have a computer system which, after a patient and practitioner have agreed on a frame and lenses, would automatically order the items if not already in stock or reorder them otherwise. It is also desired to have a computer system that would automatically prepare insurance claim forms for those patients who are eligible for reimbursement.

SUMMARY OF THE INVENTION

A system is provided permitting a patient to visualize how he or she would look given a particular choice of spectacle frames. The system takes into account the prescription information (spherical, and for astigmatic correction the cylinder and axis) and provides for the patient an image showing substantially faithfully how the patient would look if wearing the spectacle frames with lenses according to the prescription. In addition to prescription information, the program would also take into account the following: Physiognomy, e.g. shape of face (round, oval, square), placement of eyes, ears, cosmetic considerations, coloring, and size of eyes and nose, in proposing a group of frames for customer selection.

The system takes lifestyle information from the patient into account when preparing a queue of candidate frame and lens styles to be shown to the patient. Once the frame and lenses have been chosen, the system automatically orders the items if not already in stock or reorders them otherwise.

BRIEF DESCRIPTION OF THE DRAWING

The invention will be disclosed in connection with a drawing, of which.

Where possible, like elements are depicted with like reference numerals.

DETAILED DESCRIPTION OF AN EMBODIMENT

Figure 1:
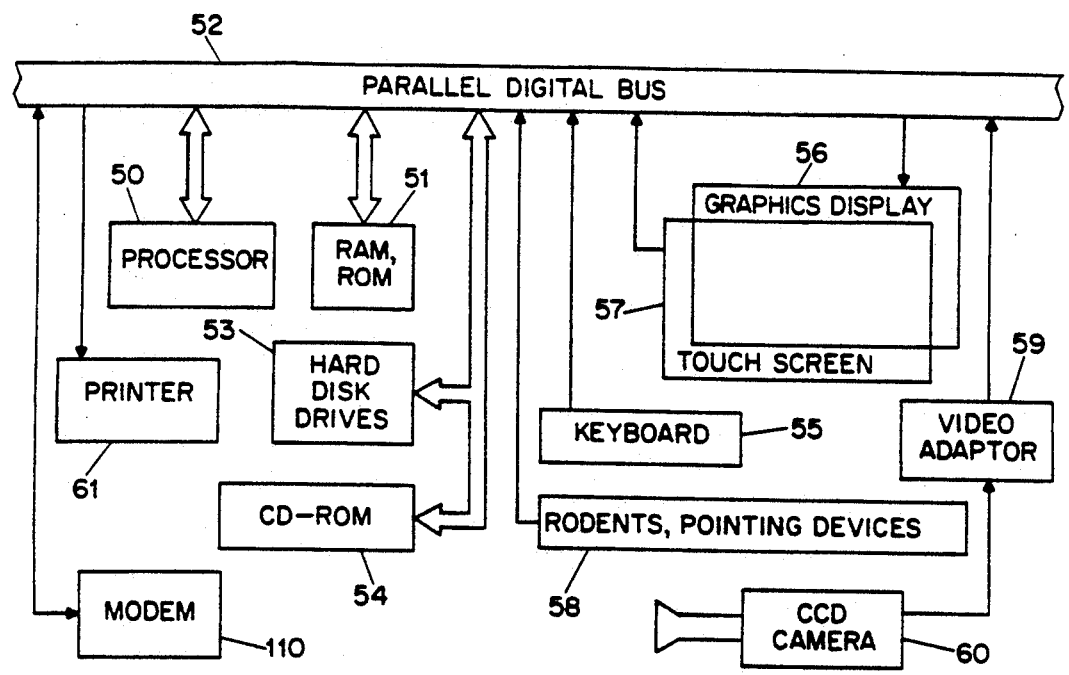
FIG. 1 shows in block diagram form the hardware aspects of the system according to the invention.

The hardware of the system of the invention will first be discussed. FIG. 1 shows the system in block diagram form, with a standard parallel digital bus 52 (preferably the bus of an AT-compatible personal computer) linking the rest of the hardware. A processor 50 (preferably compatible with the Intel 80X86 family of processors) executes instructions fetched via the bus and manipulates data read and written via the bus. RAM and ROM 51 are provided; the ROM contains BIOS code for the system. Hard disk drives 53 are provided, containing the operating system (preferably MS-DOS) and the stored program described further below. A CD-ROM drive 54 is also preferably provided. A touchscreen is provided, comprising video display 56 and touch panel 57. Traditional types of user input are provided at a keyboard 55 and optionally also at the touchscreen or by means of a rodent (preferably a mouse or joystick) or other pointing device 58. Modem 110, preferably a V32bis/V42bi's modem, provides a connection to the public switched network, not shown in FIG. 1. The hardware ensemble is completed with a video camera 60 (preferably a CCD camera) and a video adaptor 59 which converts the NTSC-scanned video signal from the camera to digital form for storage on hard disk drive 53 and later display on display 56 (preferably VGA or super VGA graphics display).

Figure 2A:
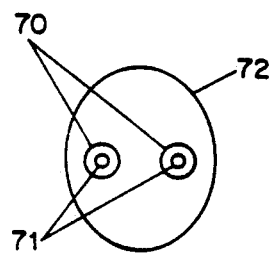
FIGS. 2a, 2b, and 2c show respectively in pictorial form a human face, and the face with negative and positive curvature spherical correction lenses before the eyes.
Figure 2B:
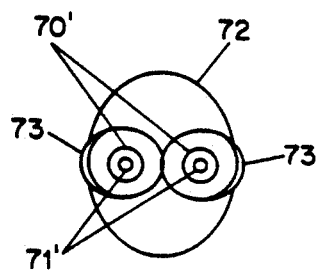
Figure 2C:
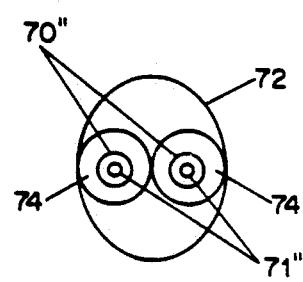

FIG. 2a shows in pictorial form a human face 72 with eyes 70 and dark regions 71 (comprising iris and pupil). FIG. 2b shows what happens when corrective lenses 73 with negative curvature are positioned in front of the eyes 71 (not visible as such in FIG. 2b). The result from the point of view of others is that the image 71' of the eyes is smaller, and that the image 70' of the iris and pupil is smaller. FIG. 2c shows what happens when corrective lenses 74 with positive curvature are positioned in front of the eyes 71 (not visible as such in FIG. 2c). The result from the point of view of others is that the image 71" of the eyes is larger, and that the image 70" of the iris and pupil is larger.

Figure 3A:
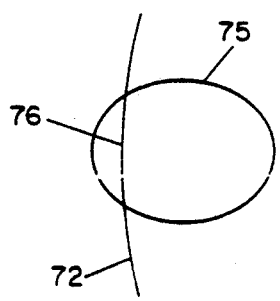
FIGS. 3a, 3b, and 3c show in detail a side of a human face, together with respectively zero, positive, and negative curvature of corrective lens.

FIG. 3a shows in detail a side of a human face 72, together with a zero-curvature lens 75. Most pertinently the line of the face 76 visible through the lens 75, representing a boundary between skin and air, is continuous with the line of the face above and below the lens 75. In real life this is almost never seen except in the case of actors and actresses who wear spectacles simply for the appearance; such spectacles are fitted with lenses 75 with zero curvature, meaning that the front and rear surfaces of the lenses are parallel.

Figure 3B:
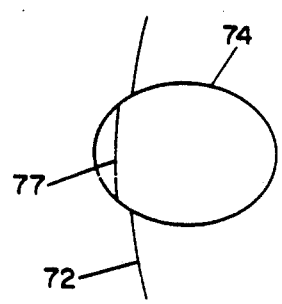
Figure 3C:
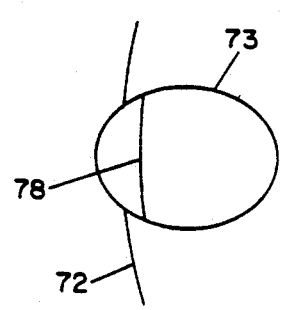

FIG. 3b shows in detail a side of a human face 72, together with a positive curvature lens 74. Most pertinently the line of the face 77 visible through the lens 74 is discontinuous with the line of the face above and below the lens 74, and has been moved outward (to the left in FIG. 3b). FIG. 3c shows in detail a side of a human face 72, together with a negative curvature lens 73. Most pertinently the line of the face 78 visible through the lens 73 is discontinuous with the line of the face above and below the lens 73, and has been moved inward (to the right in FIG. 3c).

Negatively curved lenses 73 are typically used to correct nearsightedness (myopia). Positively curved lenses 74 are typically used to correct farsightedness (due to hyperopia and/or presbyopia).

Figure 4A:
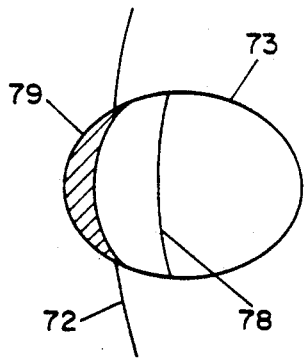
FIG. 4a shows in detail a side of a human face and depicting an internal reflection of a lens due to a high negative curvature.

FIG. 4a shows in detail a side of a human face 72, together with a strongly negative curvature lens 73. As in FIG. 3c the line of the face 78 visible through the lens 73 has been moved inward (in an amount proportional to the strength of the lens 73), but another effect may be seen. The negatively curved lens 73 is, by definition, much thicker around the edges than in the middle. This great thickness yields a great lens thickness where it meets the spectacle frame at the edge. The edge 79 gives rise to internal reflections which are visible to observers. Edge 79 may also be seen in FIG. 7a.

Figure 4B:
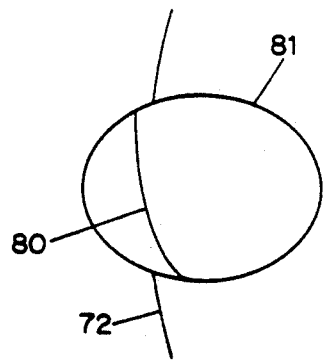
FIG. 4b shows in detail a side of a human face and depicting the consequence of a strong cylindrical correction.

FIG. 4b shows in detail a side of a human face 72, together with a lens 81 with a cylindrical curvature. Lenses 81 with a cylindrical curvature are typically used to correct astigmatism. The angular axis at which the cylindrically curved lens 81 is presented to the eye is selected to correct an aberration in the optical path of the eye, typically in the corneal shape of the eye or less often in the lens of the eye. From the perspective of the observer the lens 81 may, depending on its angular axis for the cylindrical shape, cause the line of the face 80 visible through the lens 81 to be discontinuous with the line of the face above and below the lens 74. In the particular case of FIG. 4b the line has moved outward in the upper lens area and inward in the lower lens area.

It is not uncommon for the eyes of a particular patient to require lenses with both a spherical curvature (for correction of myopia, presbyopia, or hyperopia) but also a cylindrical curvature (for correction of astigmatism). Such lenses give rise to effects which are linear combinations of those depicted in FIGS. 2b, 3c, 4a, and 4b (for myopia and astigmatism) or in FIGS. 2c, 3b, and 4b (for hyperopia or presbyopia and astigmatism). Finally, for presbyopic eyes, bifocals or trifocals are often prescribed, giving rise to combinations of the above effects for each optically distinct lens area of the bifocals or trifocals. For example, with bifocals there will generally be a large main lens area with positive spherical curvature and a smaller lower lens area with a smaller or negative spherical curvature.

Figure 5A:
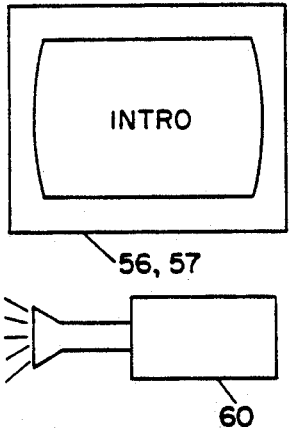
FIG. 5a, 5b, and 5c show steps in a patient session with the system of the invention.
Figure 5B:
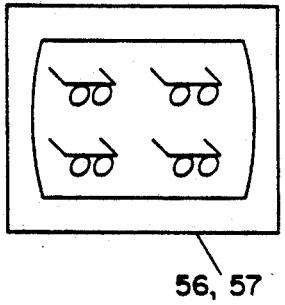
Figure 5C:
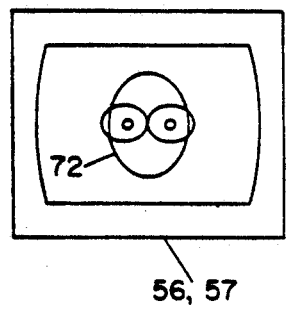

FIG. 5a, 5b, and 5c show steps in a patient session with the system of the invention. FIG. 5a shows one of the first steps for the patient, in which introductory information is provided to the patient on the screen 56 and the patient is instructed to present front and, optionally, side and oblique views to the camera 60. Lifestyle information is requested and obtained from the patient. That and later steps are facilitated by user inputs to touchscreen 57. In FIG. 5b the patient is offered a multiplicity of frame styles on the screen 56, and selects one via an input to touch screen 57.

Those skilled in the art will appreciate that a number of approaches may be taken in presenting the multiplicity of frame styles, only four of which are shown in FIG. 5b. Some users may wish to be offered frames preselected by price, while others may wish to be offered frames selected by color or material or designer make. The selection is also ideally driven by lifestyle information previously provided by the patient. Regardless of the path of user inputs, it is assumed that eventually the user may arrive at a particular frame of interest.

The frame of interest displayed in FIG. 5b is shown by means of detailed digital computer-readable information indicative of the appearance of the frame, all of which was stored in the system, preferably in CD-ROM drive 54 or hard disk drive 53. Preferably the area where the frame will be displayed is defined as an array of pixels or picture elements. The frame information includes data setting forth the boundary of the lens areas for the left and right lenses. Then the frame pixel data and face pixel data are aligned. For example, the frame must be centered on the axis of bilateral symmetry of the case. This is accomplished by having the user move back and forth in front of the camera until properly positioned, or by means of data shifts in the pixel data in the system. Likewise the frame depiction must be vertically positioned with respect to the face, again either by mechanical alignment when the camera snaps a picture of the face or by vertical data shifts. Any skew (angular misalignment) is corrected either at the time of the snapshot or in software by skew corrections well known to those skilled in the art. The frame width, tied to the intraocular spacing for the lens centers, needs to match the intraocular spacing for the snapshot as well, and is corrected either at the time of the snapshot or in software by expanding or shrinking either the face or the frame.

As mentioned above, the frame information includes data setting forth the boundary of the lens areas for the left and right lenses. After the alignment, deskewing, and resizing are accomplished, steps are taken in software to reshape or resize the face as seen through the lens areas. For a lens area having a positive spherical curvature, the face as seen through the lens area is expanded relative to the center of the lens area. For a lens area having a negative spherical curvature, the face as seen through the lens area is reduced with respect to the center of the lens area, and edge effects are simulated taking into account the lens size.

For a lens area having a cylindrical curvature, the face as seen through the lens area is reshaped to correspond to the cylindrical curvature. For a lens area having a positive cylindrical curvature, the face as seen through the lens area is expanded relative to the axis of the cylinder. For a lens area having a negative curvature, the face as seen through the lens area is reduced with respect to the axis of the cylinder.

For bifocals and trifocals these processes are performed for each active lens area.

Turning now to FIG. 5c, there is shown on display 56 a face 72, with the pixel data for the face 72 having been reshaped as described above.

The computer-readable data indicative of the image of the user may also be reversed in a left to right manner prior to being displayed. In this manner, a mirror image display is achieved.

Figure 6:
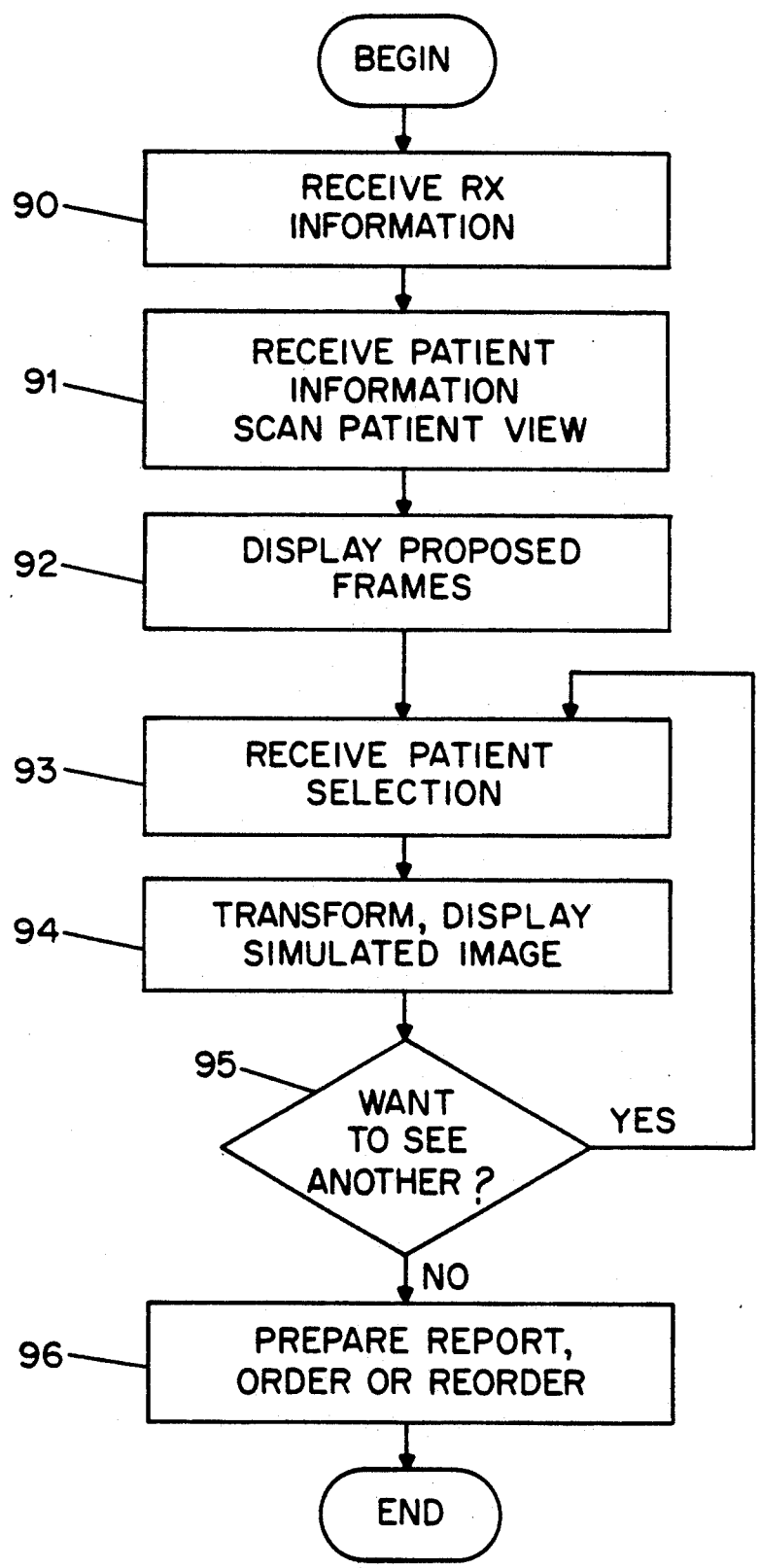
FIG. 6 shows in flowchart form a portion of the software of the system according to the invention.

FIG. 6 shows in flowchart form a portion of the software of the system according to the invention. In box 90 the system receives information (preferably from the care provider rather than from the patient) regarding the lens prescription. At 91 the patient provides information (preferably including the name and including lifestyle information) and the patient presents front and other views to the camera 60. Data therefrom is stored on hard disk 53. This corresponds to FIG. 5a.

In box 92 the system presents frame choices to the patient, as described above in connection with FIG. 5b, the pixel data having been retrieved from memory 53 or 54. A patient selection is received via touchscreen 57 in box 93, and software then performs the above-described data manipulations to superpose in software the frame and the face, and to transform the face area showing through the lens areas. After the transformations are done, in box 94, the simulated image is displayed, corresponding with box 5c. The user may select another frame type or indicate a successful selection at 95, after which a report and/or insurance claim form is printed in box 96, via printer 61. Once the frame and lenses have been chosen, the system automatically orders the items if not already in stock or reorders them otherwise. To this end the system keeps track of the inventory at all times. The ordering and reordering is preferably accomplished via modem 110 shown in FIG. 1.

Figure 7A:
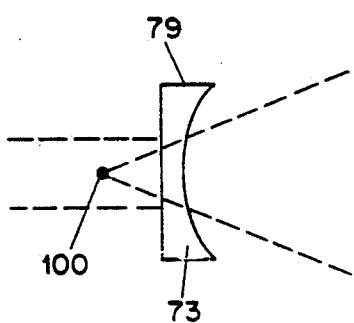
FIGS. 7a and 7b shows typical lenses with negative and positive curvature respectively.
Figure 7B:
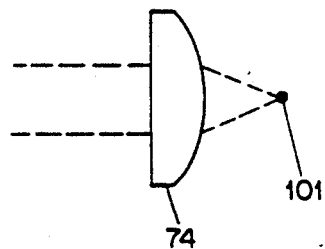

FIG. 7a shows in cross section a typical negatively curved lens 73. Edge 79 is shown, discussed above in connection with FIG. 4a. Virtual image focal point 100 is to the left of the lens, away from the eye. FIG. 7b shows in cross section a typical positively curved lens 74. Actual image focal point 101 is to the right of the lens, within the eye.

This system will also demonstrate lens "tints," both solid and gradient. In addition, the system will provide the viewer the ability to see the difference between Reflective and "Anti Reflective" surfaces. It will also allow the viewer to see how different sun glass tints look to the viewer, and, how the surroundings will be perceived to the viewer. It will (the system) also allow the viewer to see how special tints will apply to their particular profession.

Those skilled in the art will readily appreciate that numerous changes and modifications could be made to the embodiment described herein without departing in any way from the invention. For example, while the embodiment is described in which a processor 50 executes a stored program and performs the described data manipulations for generating the simulated display, one could readily employ multiple processors, one or more of which are optimized for graphics manipulations such as superpositions or visual layering. Likewise, the system could be realized just as well in random logic, employing no stored program whatsoever. The camera need not be a CCD camera but could use other imaging technologies such as a vidicon tube. User selections could be by other inputs rather than touchscreen—keyboard, mouse or other rodents, joystick, or speech recognition for example. The frame pixel data and lens area data could be distributed by CD-ROM disk or by modem or other commonly used data transmission techniques. Frame data could be compacted so as to reduce the number of distinct frame items of data required, by using a particular frame shape together with data entries indicative of the available colors, for example. These and all obvious variations of the disclosed embodiment are intended to be embraced by the claims.

I claim:

1. A spectacle imaging system comprising a processor, memory, input means, and a display, the memory containing images in computer-readable form of a plurality of spectacles including information indicative of the left and right lens areas thereof, the system further comprising:

a video camera yielding a video signal and positioned to view a user of the system;

conversion means for converting the video signal to computer-readable form;

means responsive to inputs from the user at the input means for displaying the plurality of spectacles on the display and for receiving information indicative of the user's choice of a one of the plurality of spectacles;

means responsive to inputs from a user at the input means for controllably activating the video camera and the conversion means for receiving an image of the user and for storing in the memory computer-readable data indicative of the image of the user;

means responsive to inputs at the input means for receiving first prescription information indicative of the spherical refractive power of lenses;

means responsive to the computer-readable data indicative of the image of the said one of the plurality of spectacles for determining the portion of the computer-readable data indicative of the image of the user within left and right lens areas of the spectacles;

means responsive to the first prescription information for controllably resizing the portion of the computer-readable data indicative of the image of the user within left and right lens areas of the spectacles radially with respect to a center of each lens area so as to correspond to the first prescription information;

means for manipulating the computer-readable data indicative of the image of the user and the computer-readable data indicative of the image of the said one of the plurality of spectacles so as to superpose the image of the said one of the plurality of spectacles over the image of the user; and means for displaying the superposed images on the display;

whereby the display of the superposed images portrays the visual effect of lenses according to the prescription on the appearance of the user within left and right lens areas of the spectacles with respect to the spherical refractive power thereof.

2. The system of claim 1 further comprising:

means response to inputs at the input means for receiving second prescription information indicative of the cylindrical refractive power of lenses and the angular axes thereof; and means responsive to the second prescription information for controllably resizing the portion of the computer-readable data indicative of the image of the user within left and right lens areas of the spectacles linearly with respect to an axis of each lens area so as to correspond to the second prescription information;

whereby the display of the superposed images portrays the visual effect of lenses according to the prescription on the appearance of the user within left and right lens areas of the spectacles with respect to the cylindrical refractive power and the angular axes thereof.

3. The system of claim 2 wherein the input means is a touch-screen at the video display.

4. The system of claim 2 further comprising:

means responsive to inputs at the input means for receiving information indicative of the identity of the user;

a printer; and means for printing, at the printer, information indicative of the identity of the user, information indicative of the user's choice of a one of the plurality of spectacles, information indicative of the spherical refractive power of lenses, and information indicative of the cylindrical refractive power of lenses and the angular axes thereof.

5. The system of claim 2 further comprising: means responsive to inputs at the input means for receiving information indicative of the user;

a modem; and means for communicating, via the modem, with distant equipment for fulfilling inventory of the user's choice of a one of the plurality of spectacles, information indicative of the spherical refractive power of lenses, and information indicative of the cylindrical refractive power of lenses and the angular axes thereof.

6. The system of claim 1 further comprising:

means for reversing left-for-right the computer-readable data indicative of the image of the user, whereby the display of the superposed images on the display corresponds to a mirror image.

7. A spectacle imaging system comprising a processor, memory, input means, and a display, the memory containing images in computer-readable form of a plurality of spectacles including information indicative of the left and right lens areas thereof, the system further comprising:

a video camera yielding a video signal and positioned to view a user of the system;

conversion means for converting the video signal to computer-readable form;

means responsive to inputs from the user at the input means for receiving lifestyle information from the user and, responsive to the lifestyle information, for preselecting a portion of the plurality of spectacles to be displayed on the display;

means responsive to inputs from the user at the input means for displaying the portion of the plurality of spectacles on the display and for receiving information indicative of the user's choice of one of the plurality of spectacles;

means responsive to inputs from a user at the input means for controllably activating the video camera and the conversion means for receiving an image of the user and for storing in the memory computer-readable data indicative of the image of the user;

means for manipulating the computer-readable data indicative of the image of the user and the computer-readable data indicative of the image of the said one of the plurality of spectacles so as to superpose the image of the said one of the plurality of spectacles over the image of the user; and means for displaying he superposed images on the display.

8. A spectacle imaging system comprising a processor, memory, input means, and a display, the memory containing images in computer-readable form of a plurality of spectacles including information indicative of the left and right lens areas thereof, the system further comprising:

a video camera yielding a video signal and positioned to view a user of the system;

conversion means for converting the video signal to computer-readable form;

means responsive to the data indicative of the image of the user for deriving physiognomy data therefrom and, responsive to the physiognomy data, for preselecting a portion of the plurality of spectacles to be displayed on the display;

means responsive to inputs from the user at the input means for displaying the portion of the plurality of spectacles on the display and for receiving information indicative of the user's choice of one of the plurality of spectacles;

means responsive to inputs from a user at the input means for controllably activating the video camera and the conversion means for receiving an image of the user and for storing in the memory computer-readable data indicative of the image of the user;

means for manipulating the computer-readable data indicative of the image of the user and the computer-readable data indicative of the image of the said one of the plurality of spectacles so as to superpose the image of the said one of the plurality of spectacles over the image of the user; and means for displaying he superposed images on the display;

9. A method for use with a spectacle imaging system, the system comprising a processor, memory, input means, and a display, the memory containing images in computer-readable form of a plurality of spectacles including information indicative of the left and right lens areas thereof, the system further comprising a video camera yielding a video signal and positioned to view a user of the system, and conversion means for converting the video signal to computer-readable form, the method comprising the steps of:

activating the video camera to receive an image of the user;

converting the image to computer-readable data;

storing the computer-readable data indicative of the image in the memory;

displaying the plurality of spectacles on the display;

receiving inputs from the user at the input means indicative of the user's choice of a one of the plurality of spectacles;

receiving first prescription information at the input means indicative of the spherical refractive power of lenses;

determining the portion of the computer-readable data indicative of the image of the user within left and right lens areas of the chosen spectacle;

resizing the portion of the computer-readable data indicative of the image of the user within left and right lens areas of the spectacles radially with respect to a center of each lens area so as to correspond to the first prescription information;

manipulating the computer-readable data indicative of the image of the user and the computer-readable data indicative of the image of the said one of the plurality of spectacles so as to superpose the image of the said one of the plurality of spectacles over the image of the user; and displaying the superposed image on the display.

10. The method of claim 9 further comprising the of:

receiving at the input means second prescription information indicative of the cylindrical refractive power of lenses and the angular axes thereof;

the resizing step further comprising:

resizing the portion of the computer-readable data indicative of the image of the user within left and right lens areas of the spectacles linearly with respect to an axis of each lens area so as to correspond to the second prescription information.

11. The method of claim 10 wherein the system further comprises a printer, the method further comprising the steps of:

receiving at the input means information indicative of the identity of the user; and printing, at the printer, information indicative of the identity of the user, information indicative of the user's choice of a one of the plurality of spectacles, information indicative of the spherical refractive power of lenses, and information indicative of the cylindrical refractive power of lenses and the angular axes thereof.

12. The method of claim 10 wherein the system further comprises a modem, the method further comprising the steps of:

receiving at the input means information indicative of the user; and communicating, via the modem, with distant equipment for fulfilling inventory of the user's choice of a one of the plurality of spectacles, information indicative of the spherical refractive power of lenses, and information indicative of the cylindrical refractive power of lenses and the angular axes thereof.

13. The method of claim 9 further comprising the step, performed before the step of displaying the superposed images on the display, of:

reversing left-for-right the computer-readable data indicative of the image of the user.

14. A method for use with a spectacle imaging system, the system comprising a processor, memory, input means, and a display, the memory containing images in computer-readable form of a plurality of spectacles including information indicative of the left and right lens areas thereof, the system further comprising a video camera yielding a video signal and positioned to view a user of the system, and conversion means for converting the video signal to computer-readable form, the method comprising the steps of:

activating the video camera to receive an image of the user;

converting the image to computer-readable data;

storing the computer-readable data indicative of the image in the memory;

receiving lifestyle information from the user at the input means;

preselecting a, portion of the plurality of spectacles to be displayed on the display in response to the lifestyle information;

displaying the portion of the plurality of spectacles on the display;

receiving inputs from the user at the input means indicative of the user's choice of a one of the displayed spectacles;

manipulating the computer-readable data indicative of the image of the user and the computer-readable data indicative of the image of the said one of the plurality of spectacles so as to superpose the image of the said one of the plurality of spectacles over the image of the user; and displaying the superposed image on the display.

15. A method for use with a spectacle imaging system, the system comprising a processor, memory, input means, and a display, the memory containing images in computer-readable form of a plurality of spectacles including information indicative of the left and right lens areas thereof, the system further comprising a video camera yielding a video signal and positioned to view a user of the system, and conversion means for converting the video signal to computer-readable form, the method comprising the steps of:

activating the video camera to receive an image of the user;

converting the image to computer-readable data;

storing the computer-readable data indicative of the image in the memory;

deriving physiognomy data from the data indicative of the image of the user;

preselecting a portion of the plurality of spectacles to be displayed on the display in response to the physiognomy data;

displaying the portion of the plurality of spectacles on the display;

receiving inputs from the user at the input means indicative of the user's choice of a one of the displayed spectacles;

manipulating the computer-readable data indicative of the image of the user and the computer-readable data indicative of the image of the said one of the plurality of spectacles so as to superpose the image of the said one of the plurality of spectacles over the image of the user; and displaying the superposed image on the display.

* * * * *